United States Patent
Chen

(10) Patent No.: US 7,599,188 B2
(45) Date of Patent: Oct. 6, 2009

(54) PIVOT MECHANISM AND ELECTRONIC APPARATUS USING THE SAME

(75) Inventor: Kuan-Hsun Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 274 days.

(21) Appl. No.: 11/692,207

(22) Filed: Mar. 28, 2007

(65) Prior Publication Data
US 2008/0010779 A1    Jan. 17, 2008

(30) Foreign Application Priority Data
Jul. 11, 2006   (TW) ............................. 95125202 A

(51) Int. Cl.
*H05K 7/00* (2006.01)
(52) U.S. Cl. ...................... 361/729; 361/755
(58) Field of Classification Search .............. 361/729, 361/752, 800, 797, 790, 755
See application file for complete search history.

(56) References Cited

U.S. PATENT DOCUMENTS

| | | | | |
|---|---|---|---|---|
| 5,566,048 A | * | 10/1996 | Esterberg et al. ............ | 361/681 |
| 5,950,281 A | * | 9/1999 | Lu ............................... | 16/342 |
| 5,951,312 A | * | 9/1999 | Horng ......................... | 439/165 |
| 6,070,494 A | * | 6/2000 | Horng ......................... | 74/607 |
| 6,813,812 B2 | * | 11/2004 | Lu et al. ....................... | 16/342 |
| 7,257,863 B2 | * | 8/2007 | Horng ......................... | 16/342 |
| 7,277,275 B2 | * | 10/2007 | Won et al. ................... | 361/681 |
| 7,451,522 B2 | * | 11/2008 | Lu et al. ....................... | 16/342 |
| 7,451,523 B2 | * | 11/2008 | Chen ........................... | 16/342 |

* cited by examiner

*Primary Examiner*—Hung S Bui
(74) *Attorney, Agent, or Firm*—Jianq Chyun IP Office

(57) ABSTRACT

An electronic apparatus including a first body, a second body, and a pivot mechanism is provided. The pivot mechanism includes a base, a pivot, a sleeve, and a holder. The base is fastened with the first body, and the pivot is fastened with the base. The sleeve has a hole closely fitting a section of the pivot, and the sleeve applies an elastic force on the pivot, so as to form a frictional force between the hole and the pivot. The holder having a first opening is fastened with the second body. A first section of the sleeve closely fits the opening, so as to be fastened with the first opening. The frictional force between the hole and the pivot holds the second body, such that the second body may pivot relative to the first body manually.

13 Claims, 6 Drawing Sheets

PIVOT MECHANISM AND ELECTRONIC APPARATUS USING THE SAME

CROSS-REFERENCE TO RELATED APPLICATION

This application claims the priority benefit of Taiwan application serial no. 95125202, filed Jul. 11, 2006. All disclosure of the Taiwan application is incorporated herein by reference.

BACKGROUND OF THE INVENTION

1. Field of the Invention

The present invention relates to a pivot mechanism and an electronic apparatus using the same. More particularly, the present invention relates to an electronic apparatus having a plurality of bodies and a pivot mechanism for pivotally connecting the bodies.

2. Description of Related Art

Currently, many electronic apparatuses, such as notebook computers, personal digital assistants (PDAs), mobile phones, and portable video players, are widely used by the public.

FIG. 1 is a perspective view of a conventional electronic apparatus. Referring to FIG. 1, the conventional electronic apparatus 100 normally has a first body 120, a second body 140, and a pivot mechanism 200. The pivot mechanism 200 connects the first body 120 and the second body 140, such that the first body 120 pivots relative to the second body 140 through the pivot mechanism 200. Here, a notebook computer is taken as an example of the electronic apparatus 100, so the first body 120 is a computer system base, and the second body 140 is a display.

FIG. 2 is a perspective view of the pivot mechanism of FIG. 1, and FIG. 3 is an exploded view of the pivot mechanism of FIG. 2. Referring to FIGS. 1 and 2 together, the pivot mechanism 200 mainly includes a pivot element 210, a holder 220, and a plurality of screws 224. The pivot element 210 includes a first fixing member 212, a second fixing member 214, and a rotating shaft 216. The first fixing member 212 is assembled with the second fixing member 214 through the rotating shaft 216, such that the first fixing member 212 pivots relative to the second fixing member 214. The second fixing member 214 is fastened with the first body 120 of the electronic apparatus 100 (see FIG. 1).

The holder 220 is assembled on one side of the pivot element 210, one end 222a of the holder 220 is connected with the second body 140 of the electronic apparatus 100, and the other end 222b is locked with the two screws 224 to be assembled on the first fixing member 212. The holder 220 is fastened with the second body 140 of the electronic apparatus 100, and the second fixing member 214 is fastened with the first body 120, such that the first body 120 and the second body 140 can pivot relative to each other.

SUMMARY OF THE INVENTION

The present invention is directed to a pivot mechanism, suitable for connecting a first body and a second body of an electronic apparatus, such that the first body and the second body pivot relative to each other.

The present invention is also directed to an electronic apparatus, having a pivot mechanism for adjusting and fixing a relative position of a first body and a second body of the electronic apparatus.

As embodied and broadly described herein, the present invention provides a pivot mechanism. The pivot mechanism includes a base, a pivot, a sleeve, and a holder. The pivot is fastened with the base. The sleeve has a hole closely fitting a section of the pivot. The sleeve applies an elastic force on the pivot, so as to form a frictional force between the hole and the pivot. The holder has a first opening closely fitting a first section of the sleeve.

As embodied and broadly described herein, the present invention provides an electronic apparatus. The electronic apparatus includes a first body, a second body, and the pivot mechanism. The base of the pivot mechanism is fastened with the first body, and the holder of the pivot mechanism is fastened with the second body.

In one embodiment of the present invention, the base has a riveting hole, and one end of the pivot is riveted in the riveting hole, such that the pivot is fastened with the base.

In one embodiment of the present invention, the base and the pivot are integrally formed.

In one embodiment of the present invention, the pivot mechanism further includes a collar having a second opening closely fitting a second section of the sleeve. The collar has a key, and the holder has a keyway. When the second section of the sleeve closely fits the second opening and the first section of the sleeve closely fits the first opening, the key fits the keyway.

In one embodiment of the present invention, a surface of a section of the pivot fitting the hole has at least a lubricating oil groove.

In one embodiment of the present invention, the hole extends radially to a periphery of the sleeve, such that one end face of the sleeve is substantially C-shaped.

In one embodiment of the present invention, the base is suitable for being fastened with a first body, and the holder is further fastened with a second body, so as to adjust an angle between the second body and the first body.

In one embodiment of the present invention, the first body of the electronic apparatus is a computer system base, and the second body of the electronic apparatus is a display.

In one embodiment of the present invention, the first body of the electronic apparatus is a display, and the second body of the electronic apparatus is a computer system base.

The pivot mechanism of the present invention can produce an enough frictional force, such that the relative position of the first body and the second body is fixed after the first body pivots relative to the second body. Moreover, compared with the conventional pivot mechanism, the number of the components in the present invention is small, so the cost for the components is reduced.

In order to make the aforementioned and other objectives, features and advantages of the present invention comprehensible, an embodiment accompanied with figures are described in detail below.

DESCRIPTION OF EMBODIMENTS

Figure 4:
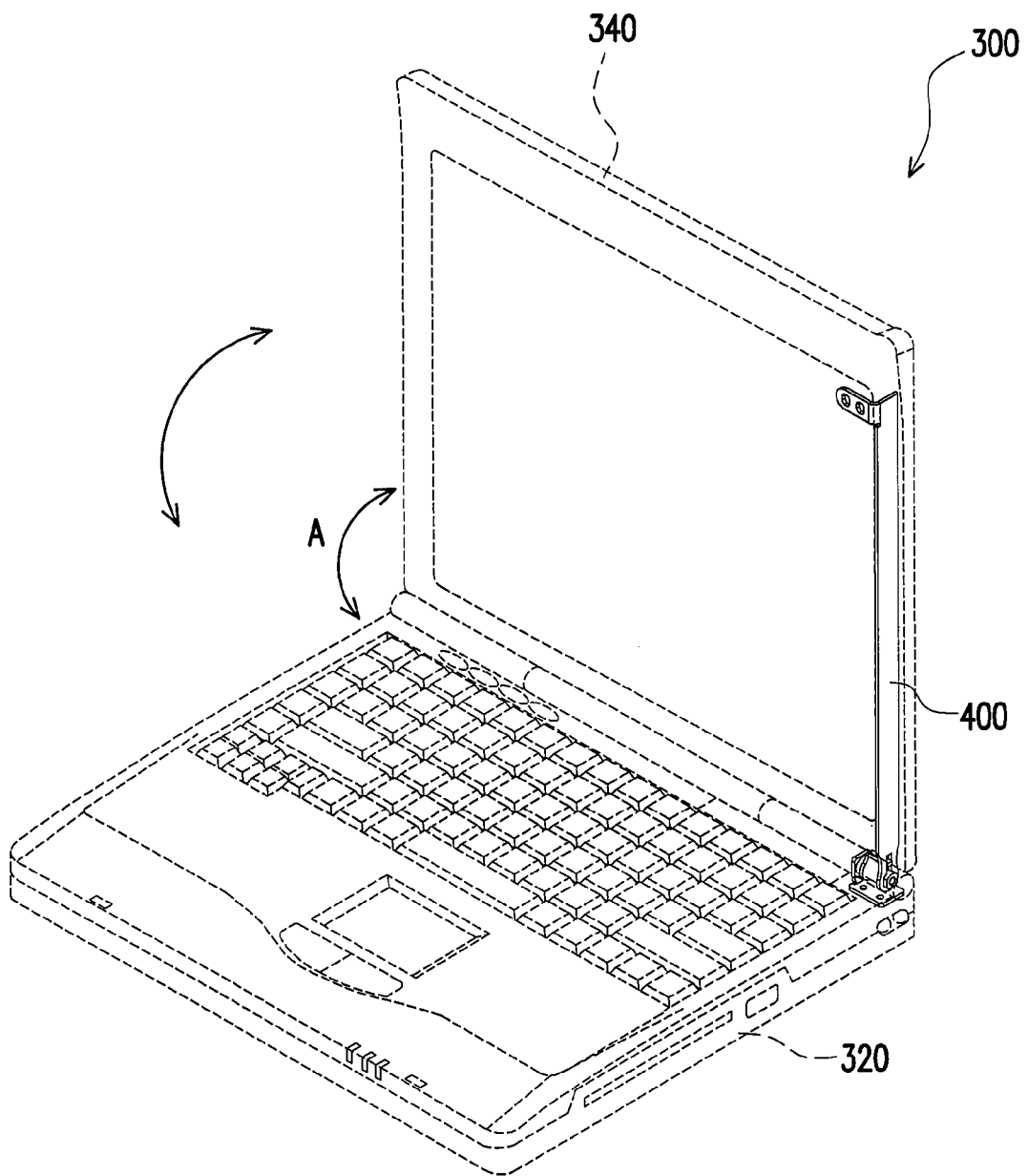
FIG. 4 is a perspective view of an electronic apparatus according to an embodiment of the present invention.

FIG. 4 is a perspective view of an electronic apparatus of one embodiment of the present invention. Referring to FIG. 4, an electronic apparatus 300 of this embodiment substantially includes a first body 320, a second body 340, and a pivot mechanism 400. The pivot mechanism 400 is connected between the first body 320 and the second body 340, such that the first body 320 and the second body 340 can pivot relative to each other, and an angle A between the second body 340 and the first body 320 can be adjusted.

The electronic apparatus 300 of this embodiment is, as shown in FIG. 4, a notebook computer, a PDA, a mobile phone, or a portable video player, which is an electronic apparatus having a foldable function. In the present embodiment, the first body 320 may be a computer system base (e.g., the main body of the notebook computer or that of the portable video player), and the second body 340 may be a display. Certainly, in another embodiment, the first body 320 may also be a display, and the second body 340 may also be a computer system base, and such configuration will not affect the overall function of the first body 320, the second body 340, and the pivot mechanism 400.

Figure 5:
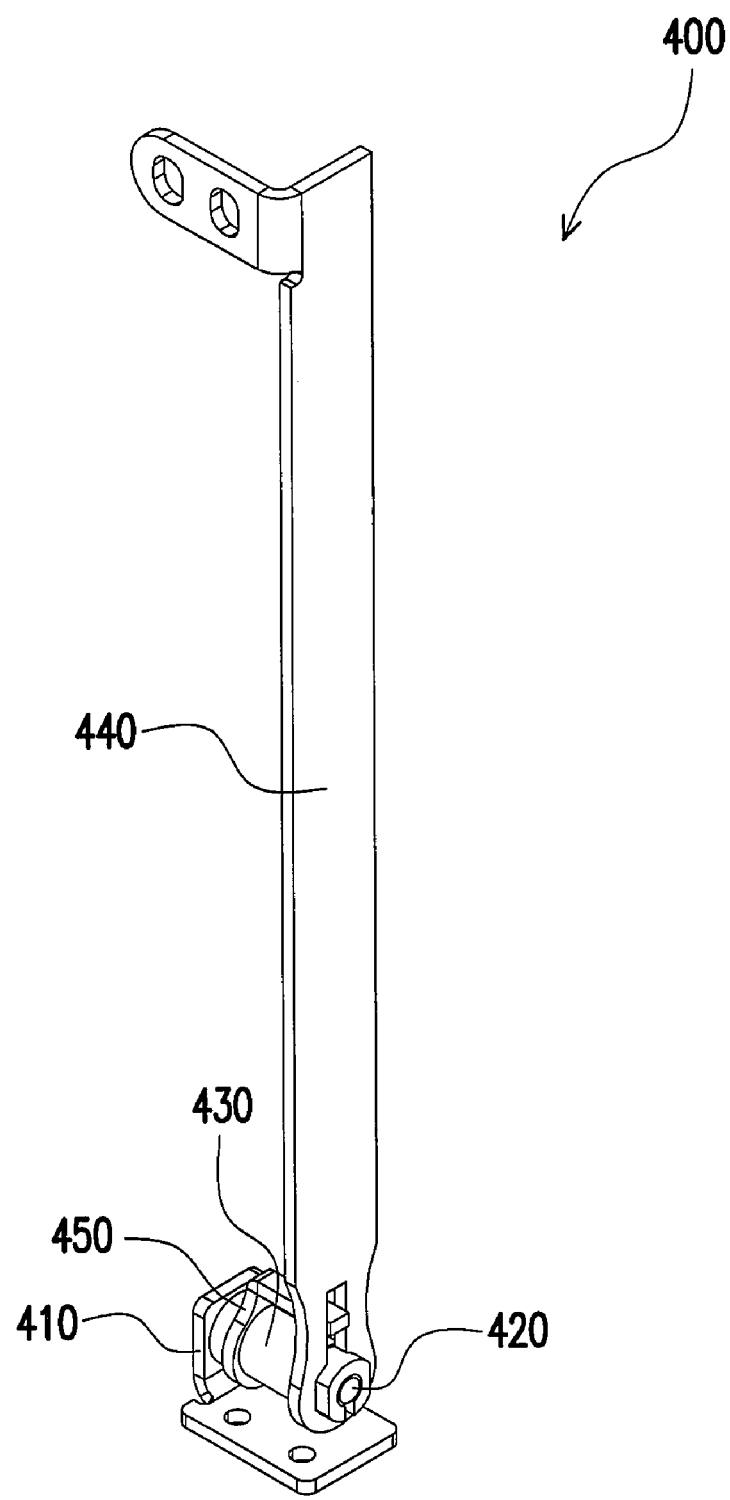
FIG. 5 is a perspective view of the pivot mechanism of FIG. 4.
Figure 6:
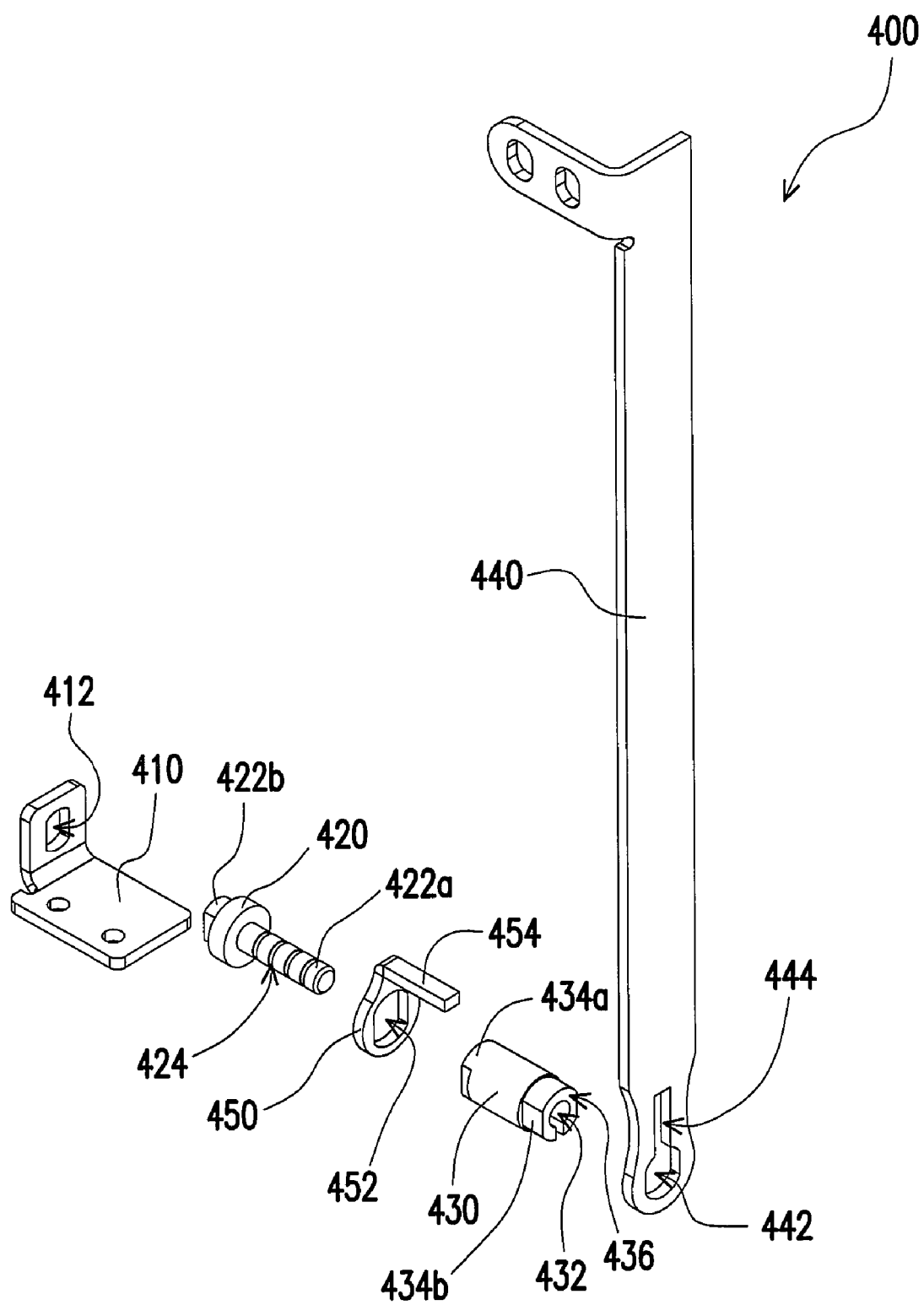
FIG. 6 is an exploded view of the pivot mechanism of FIG. 5.

FIG. 5 is a perspective view of the pivot mechanism of FIG. 4, and FIG. 6 is an exploded view of the pivot mechanism of FIG. 5. Referring FIGS. 5 and 6 together, the pivot mechanism 400 includes a base 410, a pivot 420, a sleeve 430, and a holder 440. In detail, the base 410 is fastened with the first body 320, and the holder 440 is fastened with the second body 340 (see FIG. 4).

The pivot mechanism 400 has a pivot 420 fastened with the base 410. The sleeve 430 has a hole 432 fitting a section 422a of the pivot 420, such that the sleeve 430 is sleeved on the pivot 420. The aperture of the hole 432 is slightly smaller than the outer diameter of the section 422a of the pivot 420. Therefore, after the sleeve 430 is sleeved on the pivot 420, the section 422a of the pivot 420 expands the sleeve 430, such that the aperture of the hole 432 becomes larger, and the sleeve 430 is deformed.

The deformed sleeve 430 expanded by the pivot 420 will generate an elastic force applied on the pivot 420, which will cause the deformed sleeve 430 to recover to the original state before being expanded by the pivot 420. The elastic force of the sleeve 430 is applied on the pivot 420, so as to generate a frictional force between the hole 432 and the pivot 420. The frictional force prevents the relative pivoting between the sleeve 430 and the pivot 420, so as to fix the relative position of the second body 340 and the first body 320, and to further adjust the angle A between the second body 340 and the first body 320 (see FIG. 4).

The holder 440 has a first opening 442. The outer diameter of the first section 434b of the sleeve 430 is slightly larger than the aperture of the first opening 442, so the first section 434b closely fits the first opening 442, and further the sleeve 430 closely fits the holder 440 and thus being fastened therewith.

In this embodiment, the base 410 has a riveting hole 412, and one end 422b of the pivot 420 is riveted in the riveting hole 412, such that the pivot 420 is fastened with the base 410. In the present embodiment, the pivot 420 and the base 410 may be two components fastened with each other. In another embodiment, the base 410 and the pivot 420 may be integrally formed, which also achieves the effect that the pivot 420 is fastened with the base 410.

In this embodiment, the hole 432 of the sleeve 430 extends radially to the periphery of the sleeve 430, such that an end face 436 of the sleeve 430 is substantially C-shape with a gap. The sleeve 430 with a C-shaped end face 436 is easy to be expanded and deformed by the pivot 420, such that the sleeve 430 is easy produce the elastic force applied on the pivot 420, so as to generate a frictional force between the hole 432 and the pivot 420.

However, even if the end face 436 of the sleeve 430 is not C-shaped, the sleeve 430 and the pivot 420 still closely fits each other, and the overall function of the pivot mechanism 400 is not affected. Therefore, the C-shaped end face 436 of the sleeve 430 shown in FIG. 6 is only an example, but not used for limiting the present invention.

The surface of the section 422a of the pivot 420 may have a plurality of lubricating oil grooves 424, such that lubricating oil is stored in the lubricating oil grooves 424, and is supplied onto the surface of the section 422a. After the sleeve 430 is sleeved on the pivot 420, the lubricating oil in the lubricating oil grooves 424 provides the lubrication between the sleeve 430 and the pivot 420, such that when the sleeve 430 and the pivot 420 are forced to pivot relative to each other, the problem that the sleeve 430 and the pivot 420 are difficult to pivot relative to each other due to the excessive friction between the sleeve 430 and the pivot 420, or a high-frequency noise is produced between the sleeve 430 and the pivot 420 due to the friction is prevented.

However, the lubricating oil grooves 424 are not the necessary feature of the pivot 420, and the overall function of the pivot mechanism 400 is not affected even if the pivot 420 does not have the lubricating oil grooves 424. Therefore, the lubricating oil grooves 424 of the pivot 420 shown in FIG. 6 are only an example, but not used for limiting the present invention.

In this embodiment, the pivot mechanism 400 further includes a collar 450 having a second opening 452. The outer diameter of the second section 434a of the sleeve 430 is slightly larger than the aperture of the second opening 452, such that the second section 434a closely fits the second opening 452, and further the sleeve 430 closely fits the collar 450 and thus being fastened therewith. Moreover, the collar 450 further has a key 454, and the holder 440 further has a keyway 444.

Therefore, when the second section 434a of the sleeve 430 closely fits the second opening 452, and the first section 434b closely fits the first opening 442, the key 454 fits the keyway 444, such that the holder 440 accommodates the key 454. Therefore, when the holder 440 is forced to rotate, the key 454 is driven by the keyway 444, so as to ensure that the sleeve 430 pivots with the section 422a of the pivot 420.

Figure 1:
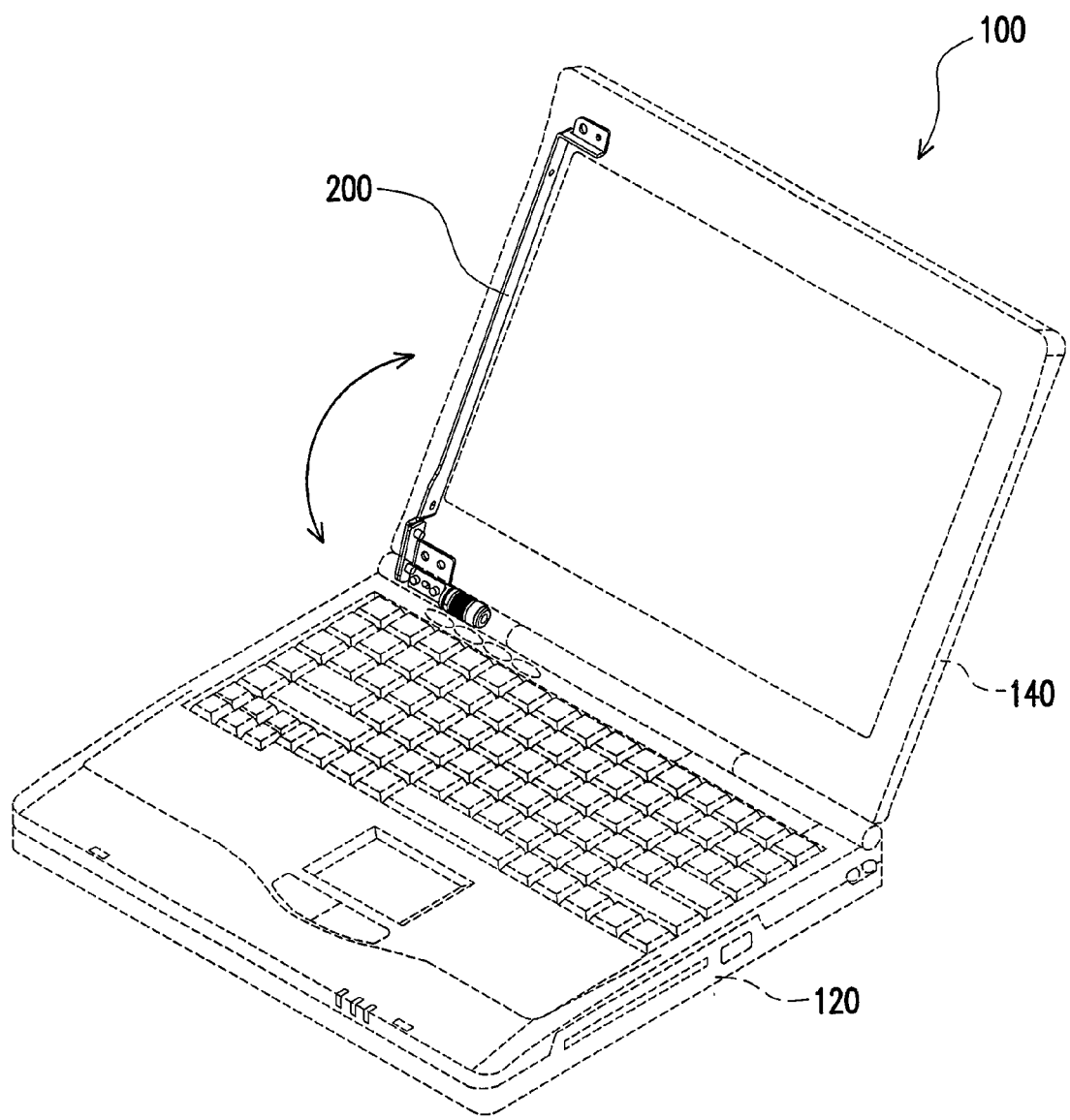
FIG. 1 is a perspective view of a conventional electronic apparatus.
Figure 2:
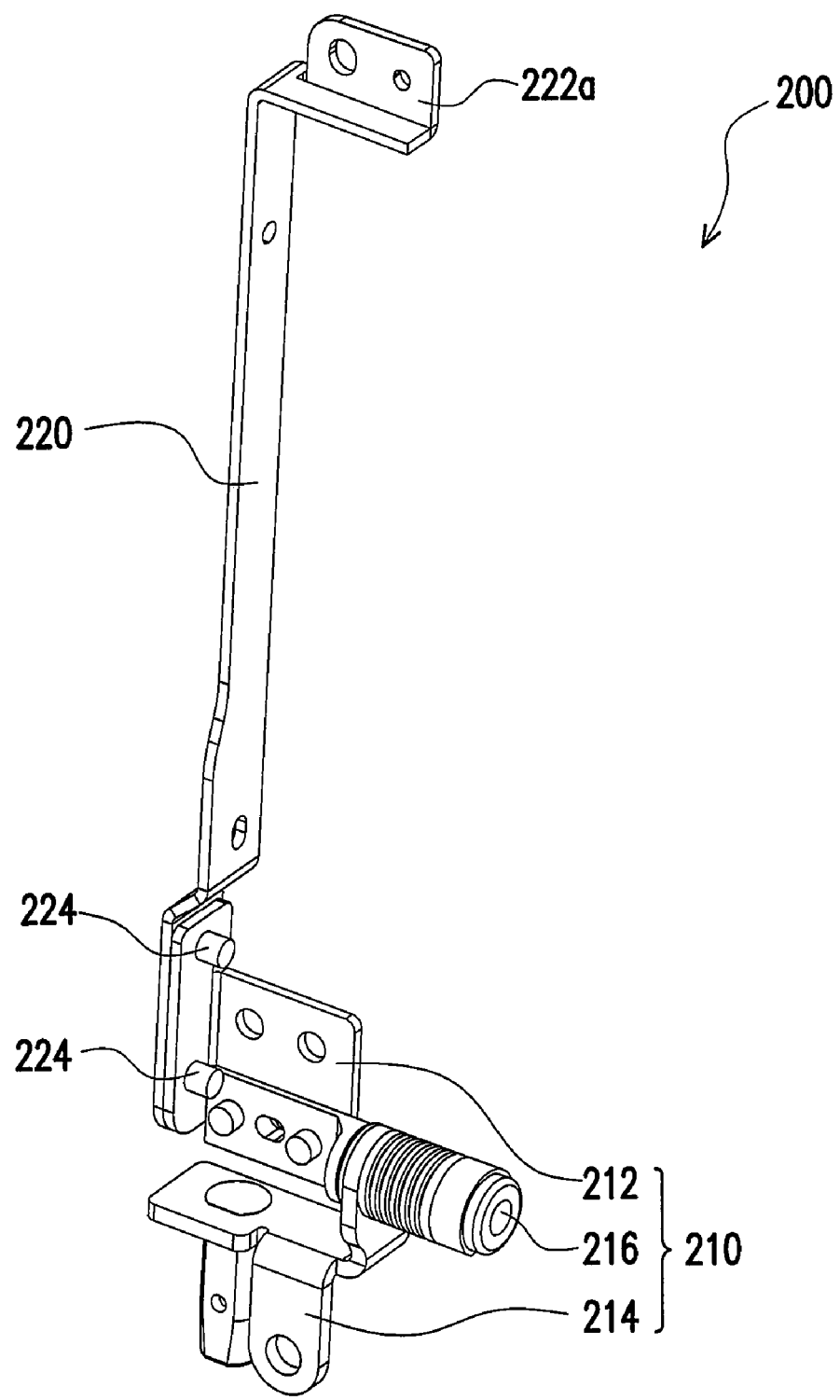
FIG. 2 is a perspective view of the pivot mechanism of FIG. 1.
Figure 3:
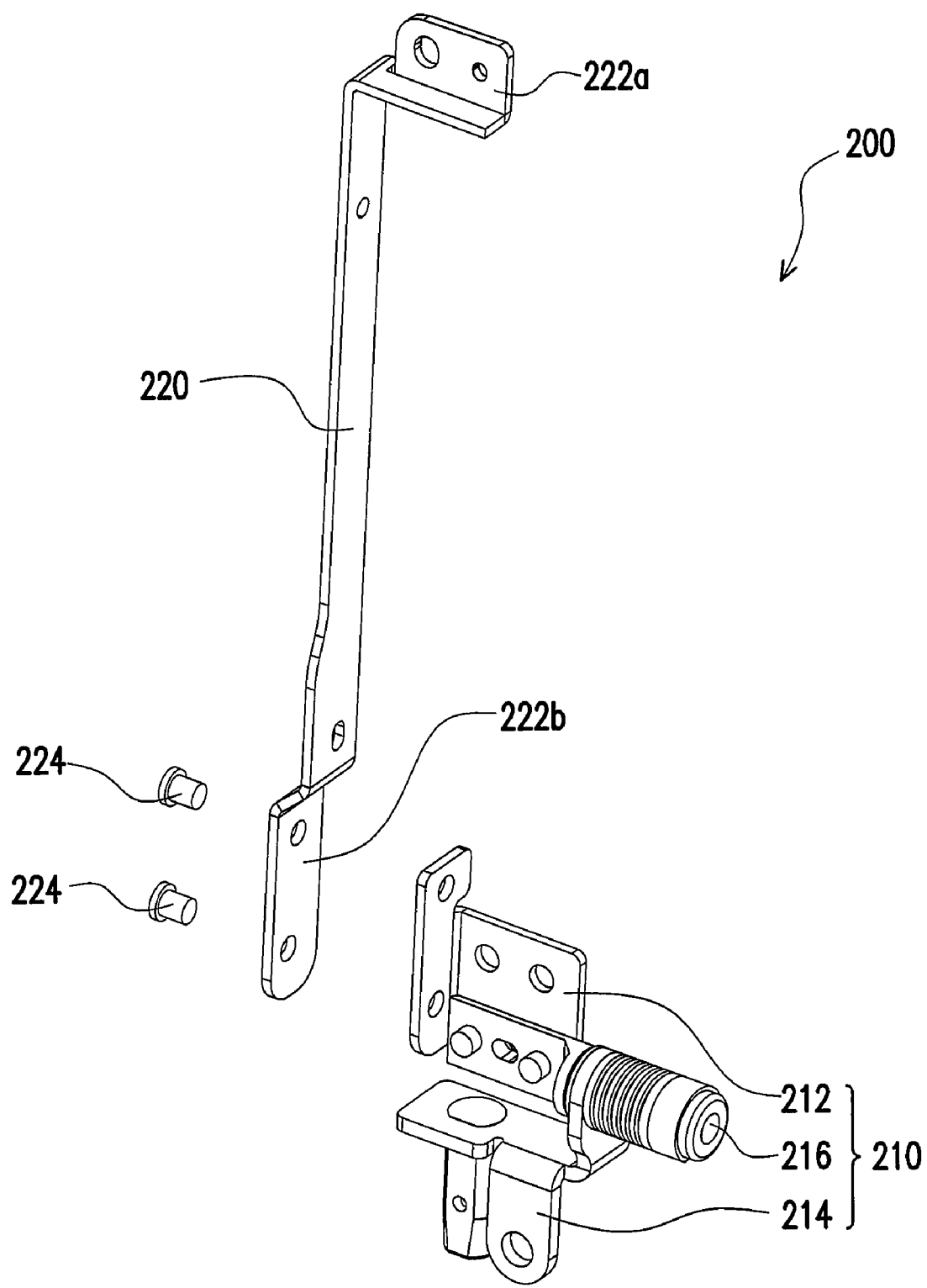
FIG. 3 is an exploded view of the pivot mechanism of FIG. 2.

To sum up, the pivot mechanism of the present invention utilizes the frictional force between the sleeve and the pivot to fix the relative position of the first body and the second body after the first body pivots relative to the second body. Moreover, compared with the conventional pivot mechanism (see FIGS. 2 and 3), the number of components in the present invention is small, so that the cost for the components is reduced.

Though the present invention has been disclosed above by an embodiment, it is not intended to limit the present invention. Anybody skilled in the art can make some modifications and variations without departing from the spirit and scope of the present invention. Therefore, the protecting range of the present invention falls in the appended claims and their equivalents.

What is claimed is:

1. A pivot mechanism, comprising:
a base;
a pivot, fastened with the base;

a sleeve, having a hole fitting a section of the pivot, and applying an elastic force on the pivot, so as to form a frictional force between the hole and the pivot;

a holder, having a first opening closely fitting a first section of the sleeve; and a collar, having a second opening closely fitting a second section of the sleeve, wherein the collar has a key, the holder has a keyway, and when the second section of the sleeve closely fits the second opening and the first section of the sleeve closely fits the first opening, the key fits the keyway.

2. The pivot mechanism as claimed in claim 1, wherein the base has a riveting hole, and one end of the pivot is riveted in the riveting hole, such that the pivot is fastened with the base.

3. The pivot mechanism as claimed in claim 1, wherein the base and the pivot are integrally formed.

4. The pivot mechanism as claimed in claim 1, wherein a surface of the section of the pivot has at least a lubricating oil groove.

5. The pivot mechanism as claimed in claim 1, wherein the hole extends radially to a periphery of the sleeve, such that one end face of the sleeve is substantially C-shaped.

6. The pivot mechanism as claimed in claim 1, wherein the base is suitable for being fastened with a first body, and the holder is further fastened with a second body, so as to adjust an angle between the second body and the first body.

7. An electronic apparatus, comprising:
a first body;
a second body; and
a pivot mechanism, comprising:
  a base, fastened with the first body;
  a pivot, fastened with the base;
  a sleeve, having a hole fitting a section of the pivot, and applying an elastic force on the pivot, so as to form a frictional force between the hole and the pivot;
  a holder, fastened with the second body, and having a first opening closely fitting a first section of the sleeve; and
  a collar, having a second opening closely fitting a second section of the sleeve, wherein the collar has a key, the holder further has a keyway, and when the second section of the sleeve closely fits the second opening and the first section of the sleeve closely fits the first opening, the key fits the keyway.

8. The electronic apparatus as claimed in claim 7, wherein the base has a riveting hole, and one end of the pivot is riveted in the riveting hole, such that the pivot is fastened with the base.

9. The electronic apparatus as claimed in claim 7, wherein the base and the pivot are formed integrally.

10. The electronic apparatus as claimed in claim 7, wherein a surface of the section of the pivot has at least a lubricating oil groove.

11. The electronic apparatus as claimed in claim 7, wherein the hole extends radially to a periphery of the sleeve, such that one end face of the sleeve is substantially C-shaped.

12. The electronic apparatus as claimed in claim 7, wherein the first body is a computer system base, and the second body is a display.

13. The electronic apparatus as claimed in claim 7, wherein the first body is a display, and the second body is a computer system base.

* * * * *